United States Patent [19]

Laput

[11] Patent Number: 4,789,286
[45] Date of Patent: Dec. 6, 1988

[54] FITTING FOR CHANNEL-SHAPED FRAMING MEMBERS

[76] Inventor: William Laput, RFD 1, Box 912D, Margaret Lane, Plainfield, Conn. 06374

[21] Appl. No.: 58,673

[22] Filed: May 27, 1987

Related U.S. Application Data

[63] Continuation of Ser. No. 825,880, Feb. 4, 1986, abandoned, which is a continuation-in-part of Ser. No. 548,645, Nov. 4, 1983, abandoned.

[51] Int. Cl.⁴ ............................................. F16B 27/00
[52] U.S. Cl. ............................... 411/84; 411/116; 411/122; 411/123; 411/427; 248/70; 248/73; 248/297.2
[58] Field of Search .................. 411/84, 85, 104, 105, 411/116, 117, 118–120, 122–124, 401, 427, 387, 405, 407; 248/70, 73, 74, 419, 420, 503.1, 429, 646, 669, 297.2

[56] References Cited

U.S. PATENT DOCUMENTS

| | | | |
|---|---|---|---|
| 1,956,219 | 4/1934 | Jenkins | 403/387 X |
| 2,099,116 | 11/1937 | Kalmbach | 411/401 X |
| 2,345,650 | 4/1944 | Amwood | 411/105 X |
| 2,354,802 | 8/1944 | Doke | 411/123 X |
| 2,386,386 | 10/1945 | Doke | 411/123 X |
| 2,439,220 | 4/1948 | Rothruchs | 403/387 |
| 2,486,723 | 11/1949 | Thompson | 403/387 X |
| 3,257,134 | 6/1966 | Boyd et al. | 403/387 X |
| 3,513,606 | 5/1970 | Jones | 248/297.2 X |
| 3,689,015 | 9/1972 | Johnson | 248/70 |
| 3,873,224 | 3/1975 | Lerzec et al. | 411/84 X |
| 4,362,422 | 12/1982 | Zingman et al. | 403/387 |
| 4,408,928 | 10/1983 | Steinke | 403/387 X |

FOREIGN PATENT DOCUMENTS

| | | | |
|---|---|---|---|
| 544650 | 2/1956 | Belgium | 403/387 |
| 2468784 | 5/1981 | France | 411/85 |
| 2496226 | 6/1982 | France | 411/405 |

OTHER PUBLICATIONS

Unistrut General Engineering Catalog No. 9A, 1981.

Primary Examiner—Gary L. Smith
Assistant Examiner—Curtis B. Brueske
Attorney, Agent, or Firm—Gurdon R. Abell

[57] ABSTRACT

A fitting, for fastening with interengaged inner and outer threaded members to a channel-shaped framing member, comprises a tab projecting into the channel to abut the inner threaded member to assure properly rotated assembly of that threaded member and to prevent improper rotation if the threaded members are loosened.

8 Claims, 1 Drawing Sheet 4,789,286

FITTING FOR CHANNEL-SHAPED FRAMING MEMBERS

CROSS-REFERENCE TO RELATED APPLICATION

This is a continuation of application Ser. No. 825,880 filed Feb. 4, 1986 and now abandoned, which was a continuation-in-part of my prior application Ser. No. 06/548,645, filed Nov. 4, 1983, now abandoned.

BACKGROUND OF THE INVENTION

1. Field of the Invention

This invention relates to fittings for use in fastening to structural members of metal framing systems, and more particularly to such fittings for use in fastening to a channel-shaped member having a longitudinal slot, in a side and narrower than that side, through which an elongated threaded element may be passed and then rotated to engage the interior of the slot for fastening to the fitting. A metal framing system of this class, together with some typical fittings and fastenings, is set forth in U.S. Pat. No. 2,345,650 to Charles W. Attwood. The disclosure of that patent is incorporated herein by reference, as if set out at length.

According to conventional usage which has developed in the construction industry with respect to this kind of framing system, a "fitting", alternatively called a "connector" or a "bracket", is understood to be a stout and strong piece of stiff bent sheet metal which is separately and separably fastened to, extends between, and transmits structural loads between, a channel-shaped framing member and one more other structural members, supports or supported objects, which are often similar framing members, thereby tying the framework together. Conversely, the term "fitting" is not customarily applied to non-loadbearing, non-load-transmitting or otherwise adventitious hardware such as springs, nameplates, shims, washers and the like. The fitting is customarily combined with one or more pairs of interengaged threaded members to constitute a fastening for joining loadbearing members of the framework. Some details and examples of typical fittings and fastenings are set forth in the Attwood patent cited hereinabove. In particular, it will be noted that one of the threaded members is elongated in axial cross-section so as to pass through the slot and be rotatable to be able to engage the inside of the slot. This kind of framing system is widely employed because it permits not only rapid and easy construction of support frameworks, but also their ready modification or removal, because the fastenings can be readily moved, removed or changed, the fittings being readily removable from both the framing members and the threaded members when the threaded members are disengaged. It is in this industry-accepted sense that the term "fitting" is employed in this application.

2. Prior Art Problem

The elongated threaded members of such fastenings are generally provided with means, such as protruding corners, which may engage the interior of the channel-shaped member, or grooves which may engage inturned flanges of its slot, for holding the threaded member in the properly rotated position for firmly fastening to the channel-shaped member when a cooperating threaded member is tightly interengaged with the elongated threaded member. However, there is risk that the elongated threaded member may not always be properly rotated to yield a strong and reliable fastening, especially where the parts must be extensively manipulated in a loosened state, or where access or visibility is difficult. Worse, it is difficult to determine by inspection whether the elongated threaded member in an assembled fastening has been properly rotated during assembly, again especially where access or visibility is difficult. Further, there is risk that the elongated threaded member may rotate away from its proper position in a fastening which has become loosened by vibration or racking overstress such as might occur during a seismic event.

SUMMARY OF THE INVENTION

It is therefore the general object of this invention to provide fitting means for maintaining proper rotation of the elongated threaded member of a fastener of the class described, and for providing tangible assurance that such proper rotation exists within the tightly interengaged fastener. If is a further object of this invention to provide means for holding the elongated threaded member in a properly-rotated position in a fastener which must be manipulated in a loosened condition or which has been loosened by vibration or overstress.

According to this invention, these objects are achieved by providing, as part of a fitting for use in a fastener of the class described, a tab, narrower than the width of the slot in the channel-shaped member, which tab passes inwardly through that slot to abut closely a longer side of the elongated threaded member. This tab, by preventing assembly of the fastener unless the elongated threaded member is properly rotated, provides visible and tangible evidence, during both assembly and inspection, that the proper rotational alignment has been achieved. And by holding the threaded member rotationally in alignment, it can both facilitate assembly of new work and retain competence of fasteners loosened by vibration or overstress.

DESCRIPTION OF THE INVENTION

There is a wide variety of fittings, for metal framing systems of this class, adapted to joining channel-shaped members to one or more other channel-shaped members or other structural members in various ways: end-to-end, at right angles, at various angles, and so on. In most cases, each channel-shaped member is separably joined to the fitting with a pair of interengaged threaded members. In the interest of clarity, this invention is described in the context of a single simple embodiment: a clamp fitting utilizing only one pair of interengaged threaded members, and adapted to clamp a channel-shaped member to a flange such as may be found on mill shapes, beams, cable trays, conduits and the like.

Figure 1:
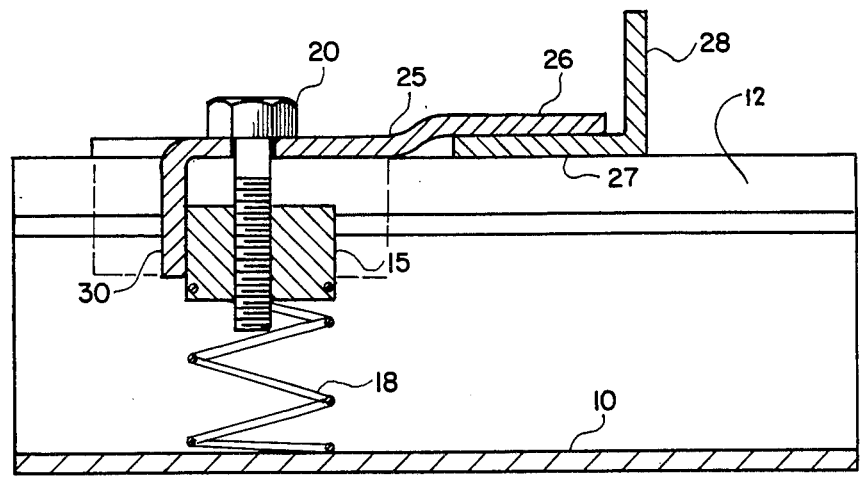
FIG. 1 is a cross-section view of a simple embodiment of this invention.
Figure 2:
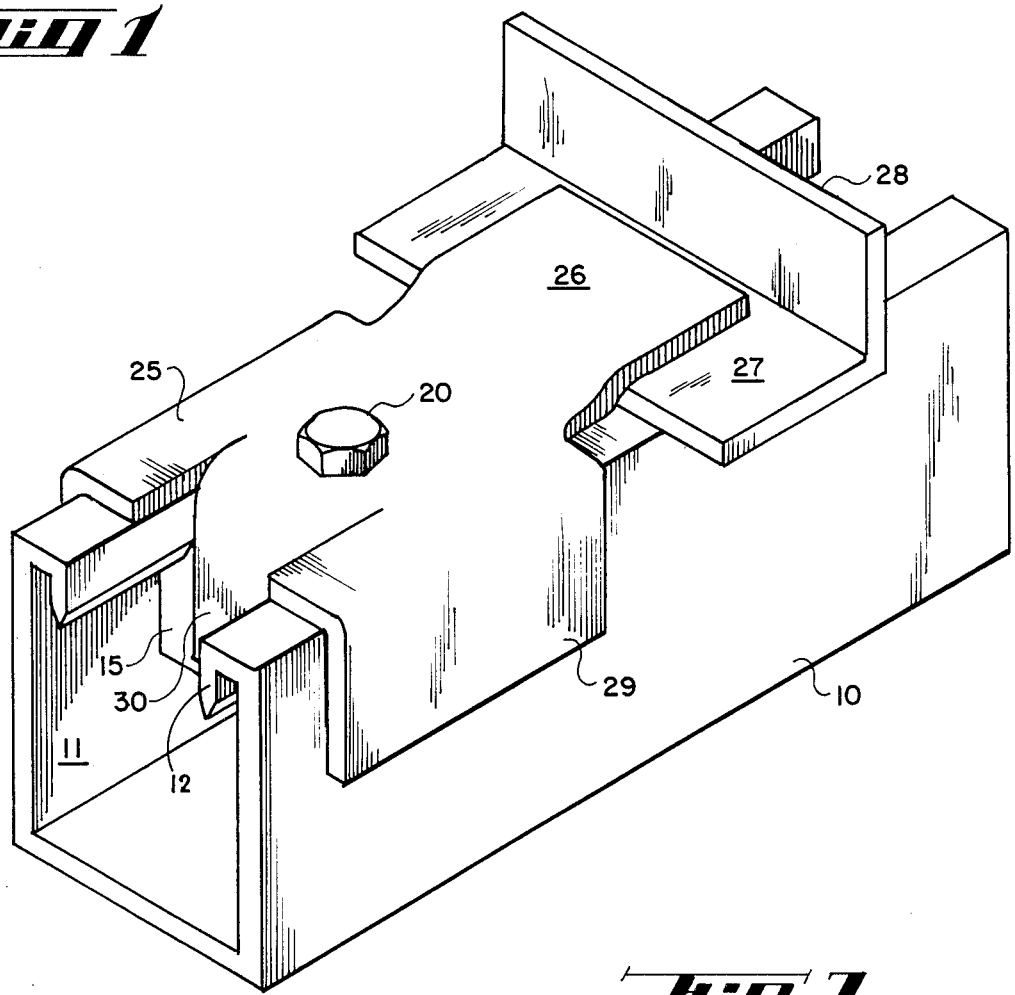
FIG. 2 is a perspective view of the same embodiment.

Attention is directed to FIGS. 1 and 2, which are respectively cross-section and perspective views of that simple embodiment. A channel-shaped framing member 10 has a longitudinal slot 11 bounded by inturned flanges 12. Fitting 25 is conventionally fastened to member 10 by nut 15 which engages inturned flanges 12 when drawn tight by bolt 20. Nut 15 may be conventionally provided with spring 18 to assist in assembly and has the usual elongated cross-section to permit insertion through slot 11 and then rotation to the position shown so that it extends over inturned flanges 12.

Fitting 25 also comprises tab 30 which projects inwardly through slot 11 and parallel to the axis of nut 15 and bolt 20, to abut a longer side of nut 15, preferably a large fraction of that side. From inspection of the Figures, it can be seen that tab 30 must be long enough to reliably abut the longer side of nut 15 and must be spaced away from the axis of the nut and bolt by a distance of the order of half the shorter side of the nut. Also from inspection of the Figures, it can be understood that a fastening employing such a tab-bearing fitting 25 cannot be assembled so that bolt 20 interengages nut 15 unless nut 15 is properly rotated to the position shown. This same fact assures that an assembled and tightened fastening of this kind has a properly-rotated nut. Also, even if the bolt and nut are or become loosened, tab 30 can prevent nut 15 from rotating to a release position.

In the simple embodiment shown in the Figures, fitting 25 is provided with a lip 26 which can clamp flange 27 of a flanged member 28, thus separately and separably fastening to that member. I prefer to provide downturned skirts 29 on fitting 25, embracing the sides of channel-shaped member 10, preferably extending downward along those sides to about the level of the end of tab 30. These not only resist rotation of fitting 25 due to forces between members 10 and 28, but also add some more bending stiffness to fitting 25 to improve its clamping effectiveness. I also prefer to form lip 26 so that it is directed slightly downward in the unassembled state, so that its subsequent slight upward deflection upon assembly provides a strong and properly-distributed clamping force upon flange 27.

In the interest of clarity, this invention has been described in the context of a simple embodiment utilizing only one pair of interengaged threaded members. For fittings connecting more channel-shaped members and therefore using more pairs of threaded members, an additional tab, similar to that illustrated in the Figures, can be provided to abut each of the additional elongated threaded members. Also, while the form of tab 30 shown in the Figures is most simply achieved as a bent portion of fitting 25, it can be made or affixed in many ways, such as a protuberance upon a cast, molded or forged fitting, a welded-on projection or the like. And, while the Figures illustrate use of that particular form of channel-shaped member and nut disclosed in the hereinabove referenced Attwood patent, this invention may be practiced with other forms of channel and nut known to the trade, such as channels without downturned flanges and nuts without grooves.

The various features and advantages of the invention are thought to be clear from the foregoing description. Various other features and advantages not specifically enumerated will undoubtedly occur to those versed in the art, as likewise many variations and modifications of the embodiment illustrated, all of which may be achieved without departing from the spirit and scope of the invention as defined by the following claims:

I claim:

1. A fitting, for removably assembling with and fastening to a channel-shaped framing member of a framework, said framing member having a longitudinal slot in a first side and narrower than said first side, said fitting having a first part externally abutting said first side and being separately and separably fastened thereto by interengaged first and second threaded members having an axis of rotation, said first part being readily separable from said first and second threaded members when said threaded members are not interengaged, said first threaded member having an elongated cross-section perpendicular to said axis at a location within said framing member, with said crosssection defining a shorter side narrower than said slot and a longer side wider than said slot to pass through said slot and be rotatable about said axis to engage the inside of said slot when said threaded members are interengaged, said fitting having a second part formed as an extension of said first part and adapted to engage, separately and separably, a further structural member of said framework and to transmit structural loads between said framing member and said further structural member, said fitting further comprising:

a tab, borne by said first part and directed inwardly into and through said slot in said first side of said framing member, substantially parallel to said axis or rotation and perpendicular to said slot, at a distance from said axis of rotation of the order of half the width of said shorter side of said first threaded member, and of length sufficient to abut a longer side of said first threaded member when said first part of said fitting is assembled with said framing member and said first threaded member, said tab being readily removable from abutment with said first threaded member when said first and second threaded members are not interengaged.

2. A fitting according to claim 1 in which said tab is formed of material bent inwardly from material, of said first part of said fitting, abutting said first side of said framing member.

3. A fitting according to claim 1 in which said tab is affixed to said first part of said fitting.

4. A fitting according to claim 1 in which said tab abuts a large fraction of said longer side of said first threaded member.

5. A fitting according to claim 1
in which said second part comprises a lip, extending from said first part substantially parallel to said first side and along said slot, for clamping a flange of said further structural member between said lip and said first side of said framing member.

6. A fitting according to claim 1 in which said first part comprises skirts downturned substantially at right angles to said first side of said framing member and embracing sides, of said framing member, contiguous to said first side.

7. A fitting according to claim 6 in which said skirts extend downwardly to about the level of the end of said tab.

8. A fitting according to claim 1 and composed of stout, strong and stiff bent sheet metal.

* * * * *